US 12,528,542 B2

(12) United States Patent
Hasegawa et al.

(10) Patent No.: US 12,528,542 B2
(45) Date of Patent: Jan. 20, 2026

(54) VEHICLE SIDE SILL STRUCTURE

(71) Applicant: Honda Motor Co., Ltd., Tokyo (JP)

(72) Inventors: Atsushi Hasegawa, Saitama (JP); Hitomi Yamada, Saitama (JP); Yumi Saito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 18/176,482

(22) Filed: Mar. 1, 2023

(65) Prior Publication Data

US 2023/0312004 A1 Oct. 5, 2023

(30) Foreign Application Priority Data

Mar. 31, 2022 (JP) ................. 2022-060075

(51) Int. Cl.
*B62D 27/02* (2006.01)
*B62D 21/15* (2006.01)
*B62D 25/02* (2006.01)
*B62D 27/00* (2006.01)

(52) U.S. Cl.
CPC ......... *B62D 25/025* (2013.01); *B62D 21/157* (2013.01); *B62D 27/023* (2013.01); *B62D 27/00* (2013.01)

(58) Field of Classification Search
CPC .. B62D 25/025; B62D 21/157; B62D 27/023; B62D 25/20
USPC ................. 296/209, 29, 30, 187.12
See application file for complete search history.

(56) References Cited

U.S. PATENT DOCUMENTS

| 5,924,765 | A | 7/1999 | Lee |
| 2010/0109385 | A1 | 5/2010 | Yamada et al. |
| 2011/0175399 | A1* | 7/2011 | Nakano ............... B62D 25/025 |
| | | | 296/193.05 |
| 2019/0193790 | A1* | 6/2019 | Choi .................... B62D 21/157 |
| 2022/0258802 | A1 | 8/2022 | Tsubaki et al. |

FOREIGN PATENT DOCUMENTS

| CN | 107985421 | 5/2018 |
| DE | 102005038463 | 2/2007 |
| JP | H10230870 | 9/1998 |
| JP | 2006021744 | 1/2006 |
| JP | 2008120179 | 5/2008 |
| JP | 2010105587 | 5/2010 |
| JP | 2016088206 | 5/2016 |

(Continued)

OTHER PUBLICATIONS

KR20220012612 Text (Year: 2022).*

(Continued)

*Primary Examiner* — Dennis H Pedder
(74) *Attorney, Agent, or Firm* — JCIPRNET

(57) ABSTRACT

A side sill 3 includes an inner panel 12, an outer panel 13, and a reinforcement member 11 arranged in a closed section formed by bonding the inner panel 12 and the outer panel 13. The reinforcement member 11 includes a first reinforcement member 26 bonded to the outer panel 13 and a second reinforcement member 27 bonded to the inner panel 12. The first reinforcement member 26 includes a concave part 28. The second reinforcement member 27 is disposed so that at least a portion of the second reinforcement member enters the concave part 28.

9 Claims, 7 Drawing Sheets

(56) References Cited

FOREIGN PATENT DOCUMENTS

| | | | | |
|---|---|---|---|---|
| JP | 2019116262 | 7/2019 | | |
| JP | 2021024350 | 2/2021 | | |
| KR | 20220012612 A | * | 2/2022 | ........... B62D 21/157 |

OTHER PUBLICATIONS

"Office Action of Japan Counterpart Application", issued on Sep. 30, 2025, with English translation thereof, p. 1-p. 10.
"Office Action of China Counterpart Application", issued on Sep. 27, 2025, with English translation thereof, p. 1-p. 14.

* cited by examiner

VEHICLE SIDE SILL STRUCTURE

CROSS-REFERENCE TO RELATED APPLICATION

This application claims the priority benefit of Japan application serial No. 2022-060075, filed on Mar. 31, 2022. The entirety of the above-mentioned patent application is hereby incorporated by reference herein and made a part of this specification.

BACKGROUND

Technical Field

The disclosure relates to a vehicle side sill structure.

Description of Related Art

Conventionally, in a vehicle, a vehicle frame member structure in which a heat foaming filling reinforcement material is filled to the inner side of a frame member of a vehicle body is known. In such vehicle frame member, it is considered to provide a reinforcement member on the inner side of the frame member to reinforce the frame member. However, in such case, a configuration in which portions of multiple reinforcement members in the longitudinal direction are overlapped and connected may be applied.

However, in the connected portions of the reinforcement members, when there are gaps among the reinforcement members, the transmission of load is insufficient, and the reinforcement members are prone to shear deformation. As a structure of suppressing the shear deformation of such reinforcement members, for example, a technique disclosed in Patent Document 1 is known.

In a vehicle frame member structure disclosed in Patent Document 1 (referred to as "conventional technology" in the specification in the following) is applied to a roof side rail of a vehicle body, and includes an inner panel, an outer panel, and a first share panel and a second share panel arranged to partition the inside of a closed section formed by bonding the inner panel and the outer panel (see FIGS. 2 and 4 of Patent Document 1).

In addition, a foaming material is filled between the inner panel as well as the outer panel and the first share panel as well as the second share panel, and an adhesive is filled between the first share panel and the second share panel (see FIG. 4 of Patent Document 1).

PRIOR ART DOCUMENT

[Patent Document]

[Patent Document 1] Japanese Laid-open No. 2016-88206

Meanwhile, it is considered to apply the conventional technology to a side sill structure arranged at two ends in a vehicle width direction in a floor part of the vehicle body and extending in the front-rear direction of the vehicle body.

The side sill in the side sill structure includes an inner panel, an outer panel, and a bulkhead arranged in a closed section formed by bonding the inner panel and the outer panel. The inner panel and the outer panel each include bonding parts at upper and lower ends thereof, and the side sill include a bonding flange formed by bonding the respective bonding parts of the inner panel and the outer panel.

Here, when the conventional technology is applied to the side sill structure, the first share panel and the second share panel are sandwiched by the bonding flange to be bonded. In such case, when the conventional technology is applied to the side sill structure, issues as follows may arise.

That is, when a force that rotates the side sill is applied to the side sill due to input of a side impact load, the bonding flange of the side sill may be peeled off, or the cross-sectional shape of the side sill may collapse easily. As a result, it may be difficult to efficiently absorb the side impact load and transmit the load to the vehicle body side.

SUMMARY

An aspect of the disclosure provides a vehicle side sill structure. In the vehicle side sill structure, a side sill arranged at two ends in a vehicle width direction in a floor part of a vehicle and extending in a front-rear direction of the vehicle includes: an inner panel, forming an inner side in the vehicle width direction; an outer panel, forming an outer side in the vehicle width direction; and a reinforcement member, arranged in a closed section formed by bonding the inner panel and the outer panel. The reinforcement member includes a first reinforcement member bonded to the outer panel and a second reinforcement member bonded to the inner panel, and the first reinforcement member includes a concave part concave to the outer side in the vehicle width direction, and the second reinforcement member is disposed so that at least a portion of the second reinforcement member enters the concave part.

BRIEF DESCRIPTION OF THE DRAWINGS

FIG. 1A is a side view illustrating a state when viewed from a lateral side of a lower edge side in a vehicle body, and FIG. 1B is a perspective view illustrating a state when a side sill and a floor part shown in FIG. 1A are viewed diagonally from top.

FIG. 5A is a perspective view illustrating the second reinforcement member in a state when viewed from upper left, and FIG. 5B is a perspective view illustrating the second reinforcement member in a state when viewed from upper right.

FIG. 6A is a side view of the second reinforcement member, and FIG. 6B is a plan view of the second reinforcement member.

DESCRIPTION OF THE EMBODIMENTS

Figure 1A:
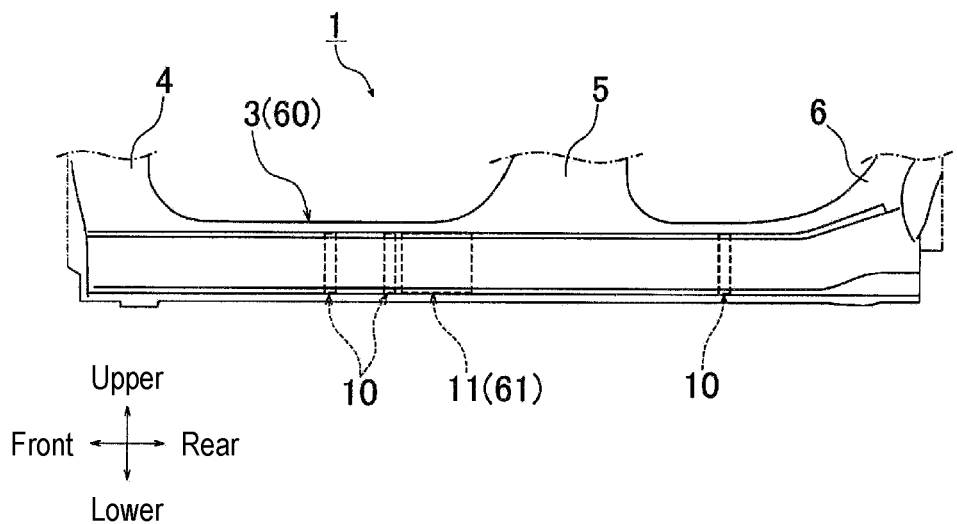
FIGS. 1A and 1B are views illustrating a side sill structure according to the disclosure.

The disclosure provides a vehicle side sill structure capable of facilitating load transmission efficiency to the vehicle body side by suppressing peeling of the side sill and the cross-sectional shape deformation when the side impact load is input, thereby suppressing the deterioration of traffic smoothness while facilitating traffic safety with the vehicle.

According to invention 1 of the disclosure, a vehicle side sill structure is provided. A side sill arranged at two ends in a vehicle width direction in a floor part of a vehicle and extending in a front-rear direction of the vehicle includes: an inner panel, forming an inner side in the vehicle width direction; an outer panel, forming an outer side in the vehicle width direction; and a reinforcement member, arranged in a closed section formed by bonding the inner panel and the outer panel. The reinforcement member includes a first reinforcement member bonded to the outer panel and a second reinforcement member bonded to the inner panel, and the first reinforcement member includes a concave part concave to the outer side in the vehicle width direction, and the second reinforcement member is disposed so that at least a portion of the second reinforcement member enters the concave part.

According to invention 2 of the disclosure, the side sill includes a bonding flange formed by bonding the inner panel and the outer panel, and the second reinforcement member extends outward in the vehicle width direction with respect to the bonding flange.

According to invention 3 of the disclosure, the second reinforcement member is bonded to an inner wall of the inner panel and an upper wall continuous with the inner wall.

According to invention 4 of the disclosure, the first reinforcement member is bonded to an upper wall and a lower wall of the outer panel, and the concave part is bonded to an outer wall of the outer panel continuous with each of the upper wall and the lower wall of the outer panel.

According to invention 5 of the disclosure, by separating the concave part of the first reinforcement member and the outer panel in a height direction of the concave part, closed sections are formed on two sides of the concave part in the height direction.

According to invention 6 of the disclosure, the side sill includes a bulkhead arranged with a cross member in the vehicle width direction, the cross member extending in the vehicle width direction in the floor part, and the reinforcement member is arranged between a center pillar of a vehicle body and the bulkhead.

According to invention 7 of the disclosure, the second reinforcement member includes a protrusion part, the protrusion part is formed in a U shape open to the inner side in the vehicle width direction when viewed from an axial direction of the side sill, and at least a portion of the protrusion part enters the concave part of the first reinforcement member.

According to invention 8 of the disclosure, in the protrusion part of the second reinforcement part, a width of the protrusion part in an upper-lower direction is gradually reduced from the inner side toward the outer side in the vehicle width direction.

According to invention 9 of the disclosure, the second reinforcement member is formed in a wave shape when viewed in the vehicle width direction.

According to invention 10 of the disclosure, in the second reinforcement member, a lower surface of the second reinforcement member is gradually inclined downward from the inner side toward the outer side in the vehicle width direction.

According to invention 1 of the disclosure, the first reinforcement member bonded to the outer panel and the second reinforcement member bonded to the inner panel are provided. The first reinforcement member includes the concave part concave to the outer side in the vehicle width direction. At least a portion of the second reinforcement member enters the concave part. Therefore, when the side sill is twisted due to input of a side impact load, the concave part of the first reinforcement member and the second reinforcement member abuts against and fit with each other, and it is possible to transmit load between the bulkhead and the side sill.

As a result, it is possible to suppress peeling of the side sill and the deformation of the cross-sectional shape of the side sill when a side impact load is input, and it is possible to facilitate the efficiency of load transmission to the side of the vehicle body.

According to invention 2 of the disclosure, the second reinforcement member extends to the outer side in the vehicle width direction with respect to the bonding flange. Therefore, it is possible to spread the side impact load input to the bonding flange to the reinforcement member, and it is possible to suppress the bonding part of the bonding flange from being peeled off.

As a result, it is possible to suppress peeling of the side sill and the deformation of the cross-sectional shape of the side sill when a side impact load is input, and it is possible to facilitate the efficiency of load transmission to the side of the vehicle body.

In addition, according to invention 3 of the disclosure, the second reinforcement member is bonded to the inner wall and the upper wall of the inner panel. Therefore, it is possible to transmit the load input during rotation of the side sill to the second reinforcement member, and it is possible to facilitate the rigidity of the side sill.

As a result, it is possible to suppress peeling of the side sill and the deformation of the cross-sectional shape of the side sill when a side impact load is input, and it is possible to facilitate the efficiency of load transmission to the side of the vehicle body.

According to invention 4 of the disclosure, the concave part of the first reinforcement member bonded to the outer panel is bonded to the outer wall of the outer panel. Therefore, it is possible to transmit the side impact load to the second reinforcement member via the first reinforcement member, and it is possible to spread the load input to the outer panel.

As a result, it is possible to suppress peeling of the side sill and the deformation of the cross-sectional shape of the side sill when a side impact load is input, and it is possible to facilitate the efficiency of load transmission to the side of the vehicle body. In particular, it is possible to suppress the deformation of the ridgeline portions at the upper and lower corners on the outer side of the outer panel in the vehicle width direction.

According to invention 5 of the disclosure, the closed sections are formed on the two sides of the concave part of the first reinforcement member in the height direction (that is, the upper and lower sides of the concave part). Therefore, it is possible to facilitate the rigidity of the corners of the outer panel, and it is possible to suppress the deformation of the side sill (collapse of the cross-sectional shape of the side sill).

As a result, it is possible to suppress peeling of the side sill and the deformation of the cross-sectional shape of the side sill when a side impact load is input, and it is possible to facilitate the efficiency of load transmission to the side of the vehicle body.

In addition, according to invention 6 of the disclosure, the reinforcement member is arranged between the center pillar and the bulkhead. Therefore, even if the side sill rotates due to collapse of the center pillar at the time of a side impact, it is possible to suppress the deformation or peeling between the center pillar and the bulkhead by using the reinforcement member, and it is possible to transmit the load to a portion where the bulkhead with high rigidity is arranged with the cross member.

As a result, it is possible to suppress peeling of the side sill and the deformation of the cross-sectional shape of the side sill when a side impact load is input, and it is possible to facilitate the efficiency of load transmission to the side of the vehicle body.

According to invention 7 of the disclosure, the second reinforcement member includes the protrusion part at least a portion of which enters the concave part of the first reinforcement member. Therefore, at the time of a side impact, the concave part and the second reinforcement member can be reliably fit with each other, and when the side sill is twisted due to input of a side impact load, the concave part of the first reinforcement member and the second reinforcement member abut against and fit with each other, and it is possible to transmit load between the bulkhead and the side sill.

As a result, it is possible to suppress peeling of the side sill and the deformation of the cross-sectional shape of the side sill when a side impact load is input, and it is possible to facilitate the efficiency of load transmission to the side of the vehicle body.

In addition, according to invention 8 of the disclosure, the width of the protrusion part of the second reinforcement member in the upper-lower direction is gradually reduced from the inner side toward the outer side in the vehicle width direction (that is, the height of the protrusion part in the upper-lower direction is gradually reduced toward the outer side in the vehicle width direction). Therefore, it is possible to suppress the collapse of the protrusion part in the upper-lower direction at the time of a side impact, and it is possible to facilitate the rigidity of the protrusion part. As a result, when the protrusion part is fit with the concave part, it is possible to efficiently transmit load between the bulkhead and the side sill.

Therefore, it is possible to suppress peeling of the side sill and the deformation of the cross-sectional shape of the side sill when a side impact load is input, and it is possible to facilitate the efficiency of load transmission to the side of the vehicle body.

According to invention 9 of the disclosure, the shape of the second reinforcement member when viewed in the vehicle width direction (that is, when viewed from the lateral side of the vehicle body) is formed in a wave shape. Therefore, it is possible to facilitate the rigidity of the second reinforcement member. As a result, when the second reinforcement member is fit with the concave part, it is possible to efficiently transmit load between the bulkhead and the side sill. Therefore, it is possible to suppress peeling of the side sill and the deformation of the cross-sectional shape of the side sill when a side impact load is input, and it is possible to facilitate the efficiency of load transmission to the side of the vehicle body.

According to invention 10 of the disclosure, in the second reinforcement member, a lower surface of the second reinforcement member is gradually inclined downward from the inner side toward the outer side in the vehicle width direction. Therefore, it is possible to easily input the rotation input to the side sill to the second reinforcement member. As a result, it is possible to suppress the deformation of the cross-sectional shape and the peeling of the side sill.

Here, the rotation input to the side sill is rotation with which the top of the side sill collapses toward the side of the compartment inside of the vehicle. Therefore, it is easy to transmit a load from the outer panel to the inner panel.

Therefore, it is possible to suppress peeling of the side sill and the deformation of the cross-sectional shape of the side sill when a side impact load is input, and it is possible to facilitate the efficiency of load transmission to the side of the vehicle body.

In the following, the first embodiment of the side sill structure according to the disclosure is described with reference to FIGS. 1A to 3, and the second embodiment of the side sill structure according to the disclosure is described with reference to FIGS. 1A, 1B and 4 to 7.

Embodiment 1

Figure 1B:
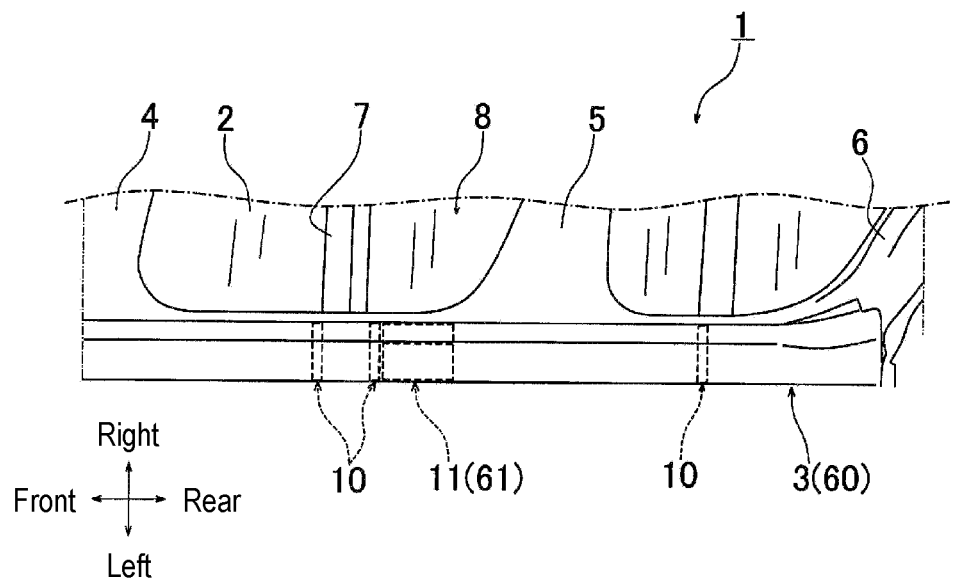
Figure 2:
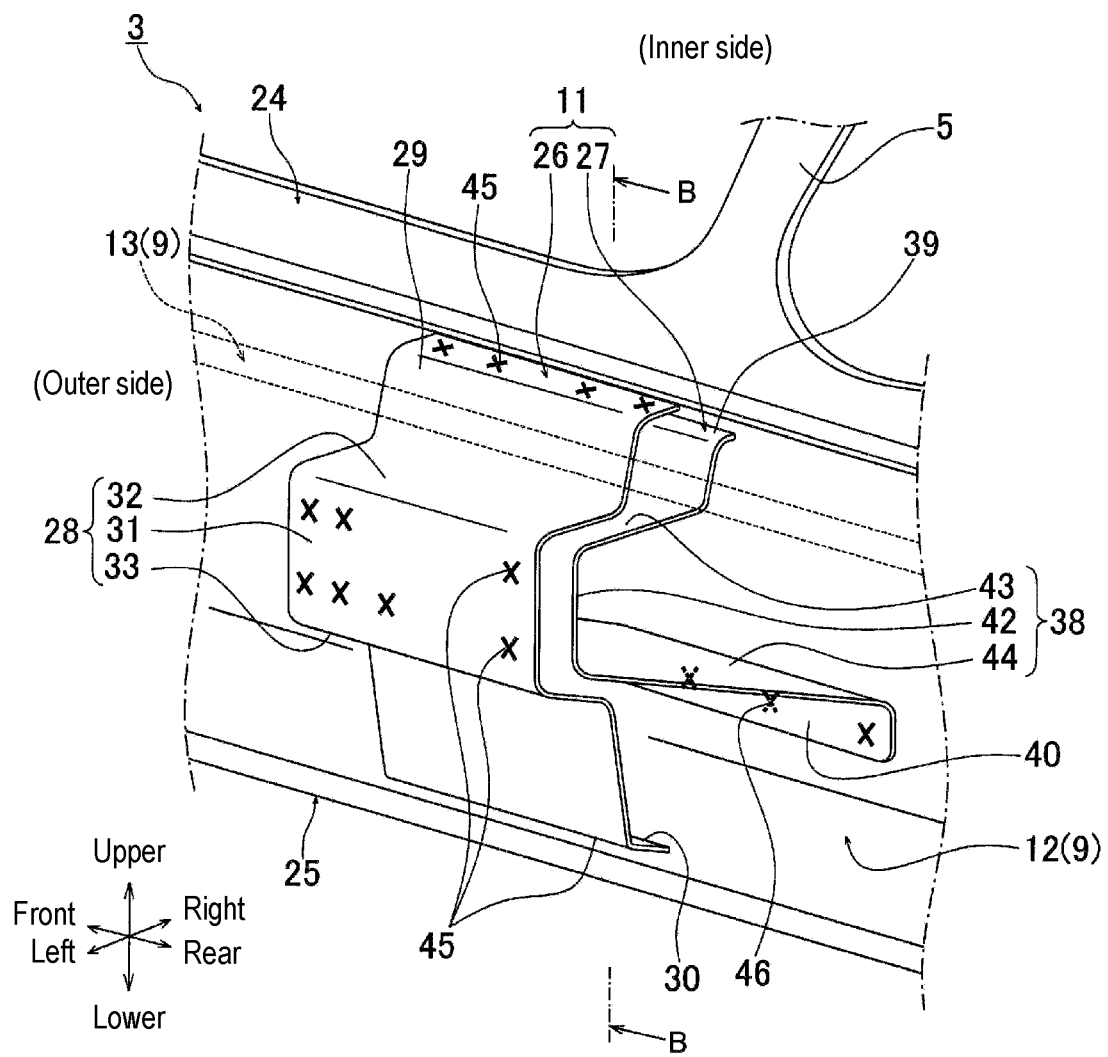
FIG. 2 is a view that partially sees through a portion (a place where a reinforcement member is arranged) of a side sill structure according to a first embodiment of the disclosure, and is a perspective view illustrating a state when viewed from behind.
Figure 3:
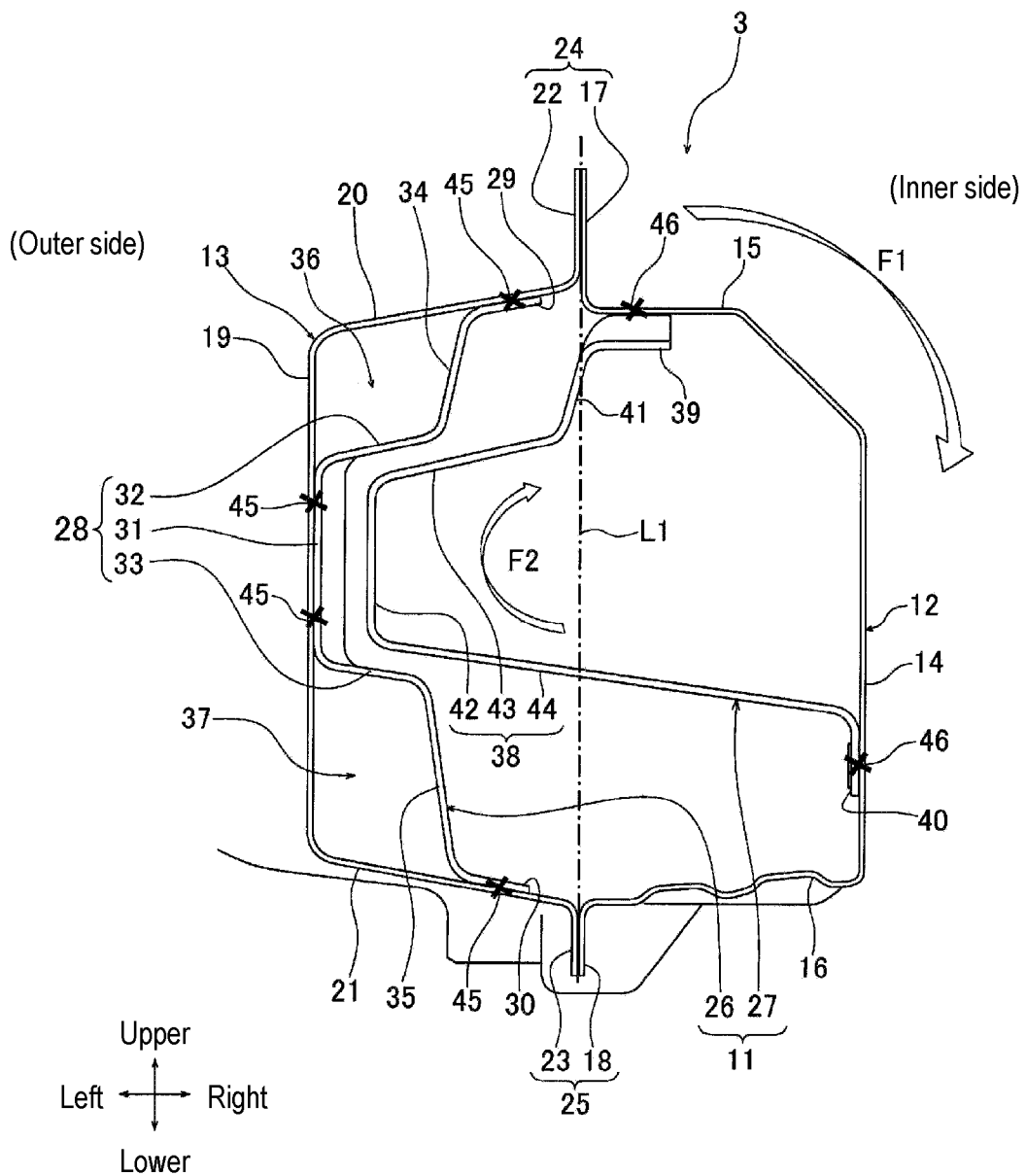
FIG. 3 is a cross-sectional view taken along B-B of FIG. 2.

In the following, the first embodiment of the disclosure is described with reference to FIGS. 1A to 3. FIGS. 1A and 1B are views illustrating the side sill structure according to the disclosure. FIG. 1A is a side view illustrating a state when viewed from a lateral side of a lower edge side in a vehicle body, and FIG. 1B is a perspective view illustrating a state when a side sill and a floor part shown in FIG. 1A are viewed diagonally from top. FIG. 2 is a view that partially sees through a portion (a place where a reinforcement member is arranged) of the side sill structure according to the first embodiment of the disclosure, and is a perspective view illustrating a state when viewed from behind. FIG. 3 is a cross-sectional view taken along B-B of FIG. 2.

Besides, the arrows in the figure respectively illustrate the upper-lower direction, the left-right direction, and the front-rear direction (the directions of the arrows merely serve as an example).

In the embodiment, a case where a side sill structure according to the disclosure is applied to a side sill 3 is described. The side sill 3 is arranged at two ends of the vehicle side direction (left-right direction in FIGS. 1A and 1B) in a floor part 2 of a vehicle body 1 of the vehicle shown in FIGS. 1A and 1B.

In addition, in FIGS. 1A and 1B, the reference symbol 4 represents "front pillar", the reference symbol 5 represents "center pillar", the reference symbol 6 represents "rear pillar", the reference symbol 7 represents "cross member", and the reference symbol 8 represents "compartment inside".

The front pillar 4, the center pillar 5, and the rear pillar 6 are respectively arranged to extend upward to configure the front side, the substantially central part, and the rear side of the vehicle body 1 as base ends to cross the side sill 3. The cross member 7 extends in the vehicle width direction of the floor part 2 to connect a pair of side sills 3.

As shown in FIG. 2, the side sill 3 includes a hollow frame body 9 extending in the front-rear direction of the vehicle body 1, multiple bulkheads 10 (see FIGS. 1A and 1B) and a reinforcement member 11 arranged inside the frame body 9.

As shown in FIGS. 2 and 3, the frame body 9 is formed by bonding an inner panel 12 forming an inner side in the vehicle width direction and an outer panel 13 forming an outer side in the vehicle width direction. In the following, each component of the side sill 3 according to the embodiment will be described.

Firstly, the inner panel 12 is described.

The inner panel 12, as shown in FIG. 3, includes an inner wall 14, an upper wall 15, a lower wall 16, and bonding parts 17 and 18.

One end of the upper wall 15 is continuous with the upper end of the inner wall 14, and is formed to extend outward in the vehicle width direction. One end of the lower wall 16 is continuous with the lower end of the inner wall 14, and is formed to extend outward in the vehicle width direction.

The bonding part 17 is continuous with the other end of the upper wall 15, and is formed to be orthogonal to the axial direction of the side sill 3 to extend upward. The bonding part 18 is continuous with the other end of the lower wall 16, and is formed to be orthogonal to the axial direction of the side sill 3 to extend downward.

Then, the outer panel 13 is described.

The outer panel 13, as shown in FIG. 3, includes an outer wall 19, an upper wall 20, a lower wall 21, and bonding parts 22 and 23.

One end of the upper wall 20 is continuous with the upper end of the outer wall 19, and is formed to extend inward in the vehicle width direction. One end of the lower wall 21 is continuous with the lower end of the outer wall 19, and is formed to extend inward in the vehicle width direction.

The bonding part 22 is continuous with the other end of the upper wall 20, and is formed to be orthogonal to the axial direction of the side sill 3 to extend upward. The bonding part 23 is continuous with the other end of the lower wall 21, and is formed to be orthogonal to the axial direction of the side sill 3 to extend downward.

As shown in FIG. 3, the frame body 9 has bonding flanges 24 and 25 formed by bonding the inner panel 12 and the outer panel 13. The bonding flange 24 is formed on the upper side of the frame body 9, and the bonding flange 25 is formed on the lower side of the frame body 9.

The bonding flange 24 is formed by bonding the bonding part 17 of the inner panel 12 and the bonding part 22 of the outer panel 13. The bonding flange 25 is formed by bonding the bonding part 18 of the inner panel 12 and the bonding part 23 of the outer panel 13.

As shown in FIG. 3, the bonding flanges 24 and 25 are arranged at substantially the same position in the vehicle width direction, and are disposed to face each other in the upper-lower direction.

Then, the bulkhead 10 is described.

The bulkhead 10 is a member that reinforces the frame body 9. Although the details are not shown, the bulkhead 10 is formed in a plate shape, and is arranged inside the frame body 9, that is, inside a closed section formed by bonding the inner panel 12 and the outer panel 13.

In the embodiment, the side sill 3 includes multiple bulkheads 10. The bulkheads 10 are arranged at predetermined intervals along a longitudinal direction of the frame body 9. In the embodiment, two bulkheads 10 are arranged at two ends of the cross member 7 in the floor part 2 (see FIG. 1B). Additionally, in the embodiment, the bulkhead 10 is also arranged between the center pillar 5 and the rear pillar 6.

Then, the reinforcement member 11 is described.

The reinforcement member 11 shown in FIGS. 2 and 3 are a member that reinforces the frame body 9, and is arranged inside the frame body 9, that is, inside the closed section formed by bonding the inner panel 12 and the outer panel 13.

The reinforcement member 11 is arranged between the center pillar 5 of the vehicle body 1 and the bulkhead 10 (see FIG. 1B). The reinforcement member 11 is arranged to be spaced apart from the bulkhead 10 at a predetermined interval to be adjacent to the bulkhead 10 in the longitudinal direction of the frame body 9.

As shown in FIGS. 2 and 3, the reinforcement member 11 is formed by two components, and includes a first reinforcement member 26 and a second reinforcement member 27. The first reinforcement member 26 and the second reinforcement member 27 are spaced apart at a predetermined interval to be arranged in the vehicle width direction.

As shown in FIGS. 2 and 3, the first reinforcement member 26 is a member formed by bending a metal plate in a predetermined shape, and includes a concave part 28 in a substantially U shape when viewed from the axial direction the side sill 3, bonding parts 29 and 30 bonded to the outer panel 13, a linking part 34 linking a concave part 28 and the bonding part 29, and a linking part 35 linking the concave part 28 and the bonding part 30.

When viewed in the axial direction of the side sill 3, the concave part 28 is concave to the outer side in the vehicle width direction and is formed in a shape that open to the inner side in the vehicle width direction, and includes a side wall 31, an upper wall 32, and a lower wall 33. The side wall 31 is bonded to the outer wall 19 of the outer panel 13. The upper wall 32 is continuous with the upper end of the side wall 31, and formed to extend toward the inner side in the vehicle width direction. The lower wall 33 is continuous with the lower end of the side wall 31, and formed to extend toward the inner side in the vehicle width direction.

The bonding part 29 is linked to the upper end of the concave part 28 via the linking part 34, and is formed to be bondable with the upper wall 20 of the outer panel 13. The bonding part 30 is linked to the lower end of the concave part 28 via the linking part 35, and is formed to be bondable with the lower wall 21 of the outer panel 13.

As shown in FIG. 3, the concave part 28 is formed to be separated from the outer panel 13 in the height direction (upper-lower direction) of the concave part 28 in the state in which the first reinforcement member 26 is bonded to the outer panel 13. More specifically, a predetermined interval is each provided between the upper wall 32 of the concave part 28 and the upper wall 20 of the outer panel 13 and between the lower wall 33 of the concave part 28 and the lower wall 21 of the outer panel 13.

As shown in FIG. 3, by forming the concave part 28 as described above, a closed section is formed by the outer wall 19 and the upper wall 20 of the outer panel 13, the upper wall 32 of the concave part 28, and the linking part 34 on the upper side of the concave part 28 in the height direction. In addition, on the lower side of the concave part 28 in the height direction, a closed section is formed by the outer wall 19 and the lower wall 21 of the outer panel 13 and the lower wall 33 of the concave part 28 and the linking part 35.

A space surrounded by the outer wall 19 and the upper wall 20 of the outer panel 13, the upper wall 32 of the concave part 28, and the linking part 34 is formed as a hollow part 36. In addition, a space surrounded by the outer wall 19 and the lower wall 21 of the outer panel 13, the lower wall 33 of the concave part 28, and the linking part 35 is formed as a hollow part 37.

As shown in FIGS. 2 and 3, the second reinforcement member 27 is a member formed by bending a metal plate in a predetermined shape, and includes a protrusion part 38 in a substantially U shape when viewed from the axial direction the side sill 3, bonding parts 39 and 40 bonded to the inner panel 12, and a linking part 41 linking the protrusion part 38 and the bonding part 39.

When viewed in the axial direction of the side sill 3, the protrusion part 38 is concave to the outer side in the vehicle width direction and is formed in a shape that open to the inner side in the vehicle width direction, and includes a side wall 42, an upper wall 43, and a lower wall 44.

The side wall 42 is formed as a portion equivalent to the tip end of the second reinforcement part 27. The upper wall 43 is continuous with the upper end of the side wall 42, and formed to extend toward the inner side in the vehicle width direction. The lower wall 44 is continuous with the lower end of the side wall 42, and formed to extend toward the inner side in the vehicle width direction.

The protrusion part 38 is formed so that the width in the height direction (the upper-lower direction) of the protrusion part 38 is gradually reduced from the inner side toward the outer side in the vehicle width direction. That is, the width between the upper wall 43 and the lower wall 44 is formed to be gradually reduced from the inner side toward the outer side in the vehicle width direction.

In a state of being bonded to the inner panel 12 as shown in FIG. 3, the second reinforcement member 27 is disposed so that at least a portion of the second reinforcement member 27 enters the concave part 28. More specifically, the second reinforcement member 27 is disposed so that the side of the side wall 42 of the protrusion part 38 enters the concave part 28.

In addition, in the state of being bonded to the inner panel 12 as shown in FIG. 3, the second reinforcement member 27 is formed so that the protrusion part 38 extends toward the outer side in the vehicle width direction with respect to the bonding flanges 24, 25 (virtual line L1).

The bonding part 39 is linked to the upper end of the protrusion part 38 via the linking part 41, and is formed to be bondable with the upper wall 15 of the inner panel 12. In addition, the bonding part 40 is linked to the lower end of the protrusion part 38, and is formed to be bondable with the inner wall 14 of the inner panel 12.

As shown in FIGS. 2 and 3, the first reinforcement member 26 is bonded to the outer panel 13, and the second reinforcement member 27 is bonded to the inner panel 12. Here, "bonding" in the embodiment refers to bonding by welding.

The first reinforcement member 26 is respectively bonded to the outer wall 19, the upper wall 20, and the lower wall 21 of the outer panel 13, and the second reinforcement member 27 is respectively bonded to the inner wall 14 and the upper wall 15 of the inner panel 12. As shown in FIGS. 2 and 3, the reference symbol 45 represents bonded portions between the first reinforcement member 26 and the outer panel 13, and the reference symbol 46 represents bonded portions between the second reinforcement member 28 and the inner panel 12.

In the following, the functions and effects obtained through the embodiment are described with reference to FIGS. 1A and 1B, and FIG. 3.

According to the embodiment, the first reinforcement member 26 bonded to the outer panel 13 and the second reinforcement member 27 bonded to the inner panel 12 are provided. The first reinforcement member 26 includes the concave part 28 concave to the outer side in the vehicle width direction. At least a portion of the second reinforcement member 27 enters the concave part 28. Therefore, when the side sill is twisted (as indicated by an arrow F1 in FIG. 3) due to input of a side impact load, the second reinforcement member 27 rotates (as indicated by an arrow F2 in FIG. 3), and the concave part 28 of the first reinforcement member 26 and the second reinforcement member 27 abuts against and fit with each other, and it is possible to transmit load between the bulkheads 10 (see FIGS. 1A and 1B) and the side sill 3.

As a result, it is possible to suppress peeling of the side sill 3 and the deformation of the cross-sectional shape of the side sill 3 when a side impact load is input, and it is possible to facilitate the efficiency of load transmission to the side of the vehicle body 1 (see FIGS. 1A and 1B).

In addition, according to the embodiment, the second reinforcement member 27 extends to the outer side in the vehicle width direction with respect to the bonding flanges 24 and 25. Therefore, it is possible to spread the side impact load input to the bonding flanges 24 and 25 to the reinforcement member 11 (the first reinforcement member 26, the second reinforcement member 27), and it is possible to suppress the bonding parts of the bonding flanges 24 and 25 from being peeled off.

As a result, it is possible to suppress peeling of the side sill 3 and the deformation of the cross-sectional shape of the side sill 3 when a side impact load is input, and it is possible to facilitate the efficiency of load transmission to the side of the vehicle body 1.

In addition, according to the embodiment, the second reinforcement member 27 is bonded to the inner wall 14 and the upper wall 15 of the inner panel 12. Therefore, it is possible to efficiently transmit the load input during rotation of the side sill 3 to the second reinforcement member 27, and it is possible to facilitate the rigidity of the side sill 3.

As a result, it is possible to suppress peeling of the side sill 3 and the deformation of the cross-sectional shape of the side sill 3 when a side impact load is input, and it is possible to facilitate the efficiency of load transmission to the side of the vehicle body 1.

Also, according to the embodiment, the concave part 28 of the first reinforcement member 26 bonded to the outer panel 13 is bonded to the outer wall 19 of the outer panel 13. Therefore, it is possible to transmit the side impact load to the second reinforcement member 27 via the first reinforcement member 26, and it is possible to spread the load input to the outer panel 13.

As a result, it is possible to suppress peeling of the side sill 3 and the deformation of the cross-sectional shape of the side sill 3 when a side impact load is input, and it is possible to facilitate the efficiency of load transmission to the side of the vehicle body 1. In particular, it is possible to suppress the deformation of the ridgeline portions at the upper and lower corners on the outer side of the outer panel 13 in the vehicle width direction.

In addition, according to the embodiment, the closed sections (hollow parts 36, 37) are formed on the two sides of the concave part 28 of the first reinforcement member 26 in the height direction (that is, the upper and lower sides of the concave part 28). Therefore, it is possible to facilitate the rigidity of the corners of the outer panel 13, and it is possible to suppress the deformation of the side sill 3 (collapse of the cross-sectional shape of the side sill 3).

As a result, it is possible to suppress peeling of the side sill 3 and the deformation of the cross-sectional shape of the side sill 3 when a side impact load is input, and it is possible to facilitate the efficiency of load transmission to the side of the vehicle body 1.

In addition, according to the embodiment, the reinforcement member 11 is arranged between the center pillar 5 and the bulkhead 10 (see FIGS. 1A and 1B). Therefore, even if the side sill 3 rotates due to collapse of the center pillar 5 at the time of a side impact, it is possible to suppress the deformation or peeling between the center pillar 5 and the bulkhead 10 by using the reinforcement member 11, and it is possible to transmit the load to a portion where the bulkhead 10 with high rigidity is arranged with the cross member 7 (see FIG. 1B).

As a result, it is possible to suppress peeling of the side sill 3 and the deformation of the cross-sectional shape of the side sill 3 when a side impact load is input, and it is possible to facilitate the efficiency of load transmission to the side of the vehicle body 1.

In addition, according to the embodiment, the second reinforcement member 27 includes the protrusion part 38 at least a portion of which enters the concave part 28 of the first reinforcement member 26. Therefore, at the time of a side impact, the concave part 28 of the first reinforcement member 26 and the second reinforcement member 27 can be reliably fit with each other, and when the side sill 3 is twisted due to input of a side impact load, the concave part 28 of the first reinforcement member 26 and the second reinforcement member 28 abut against and fit with each other, and it is possible to transmit load between the bulkhead 10 and the side sill 3.

As a result, it is possible to suppress peeling of the side sill 3 and the deformation of the cross-sectional shape of the side sill 3 when a side impact load is input, and it is possible to facilitate the efficiency of load transmission to the side of the vehicle body 1.

In addition, according to the embodiment, the width of the protrusion part 38 of the second reinforcement member 27 in the upper-lower direction is gradually reduced from the inner side toward the outer side in the vehicle width direction (that is, the height of the protrusion part 38 in the upper-lower direction is gradually reduced toward the outer side in the vehicle width direction). Therefore, it is possible to suppress the collapse of the protrusion part 38 in the upper-lower direction at the time of a side impact, and it is possible to facilitate the rigidity of the protrusion part 38. As a result, when the protrusion part 38 is fit with the concave part 28, it is possible to efficiently transmit load between the bulkhead 10 and the side sill 3.

Therefore, it is possible to suppress peeling of the side sill 3 and the deformation of the cross-sectional shape of the side sill 3 when a side impact load is input, and it is possible to facilitate the efficiency of load transmission to the side of the vehicle body 1.

Embodiment 2

Regarding the side sill structure according to the disclosure, in addition to the first embodiment, the second embodiment as follows may also be adopted.

In the following, the second embodiment of the disclosure is described with reference to FIGS. 1A, 1B and FIGS. 4 to 7.

Figure 4:
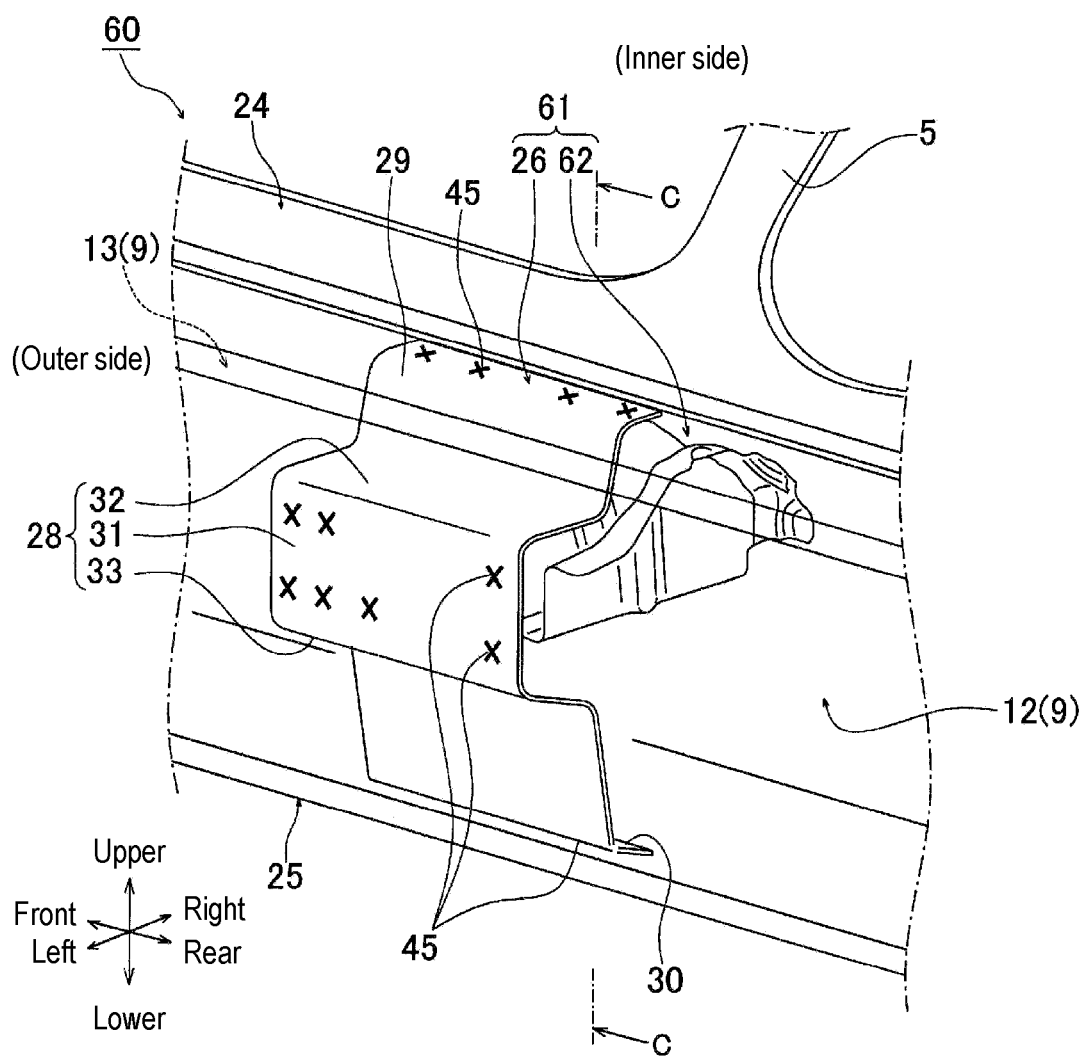
FIG. 4 is a view that partially sees through a portion (a place where a reinforcement member is arranged) of a side sill structure according to a second embodiment of the disclosure, and is a perspective view illustrating a state when viewed from behind.
Figure 5A:
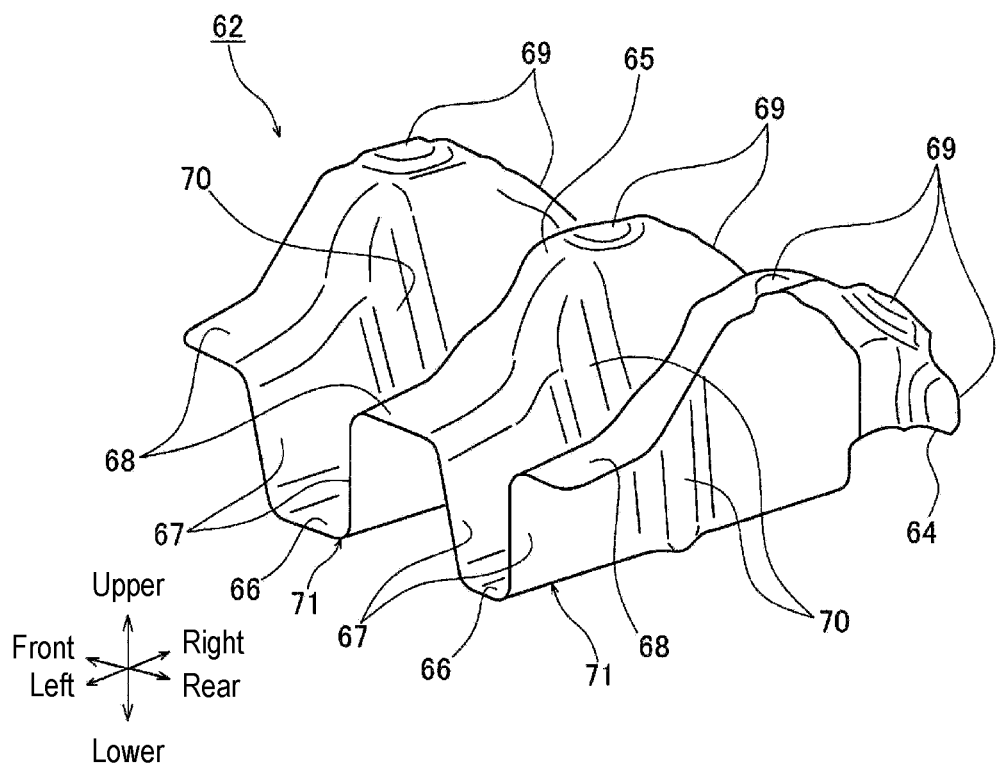
FIGS. 5A and 5B are views illustrating a second reinforcement member according to the second embodiment of the disclosure.
Figure 5B:
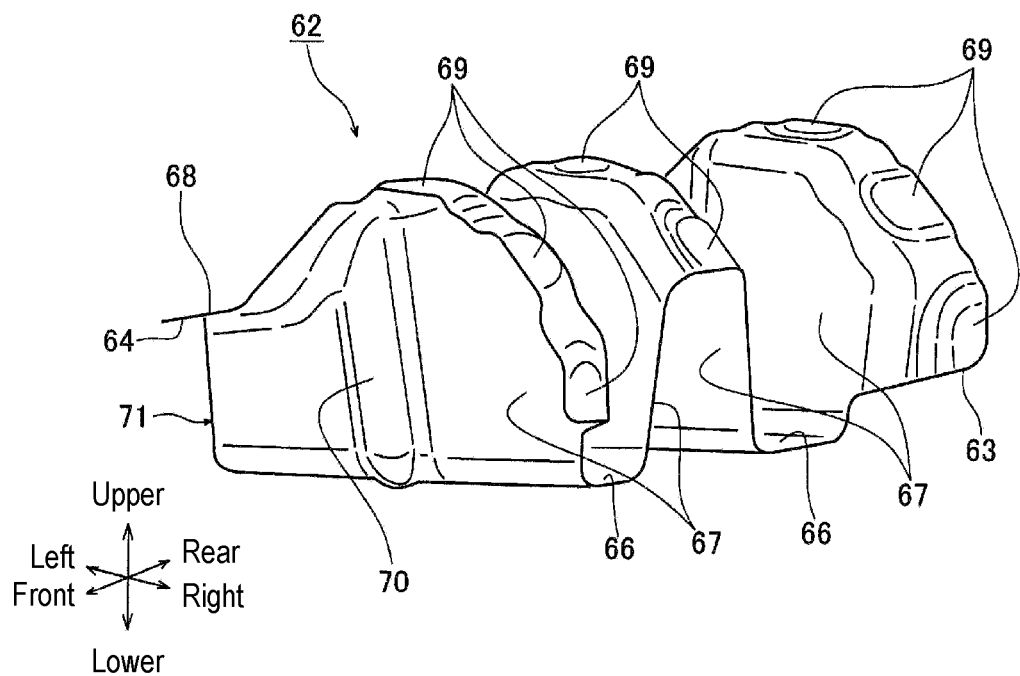
Figure 6A:
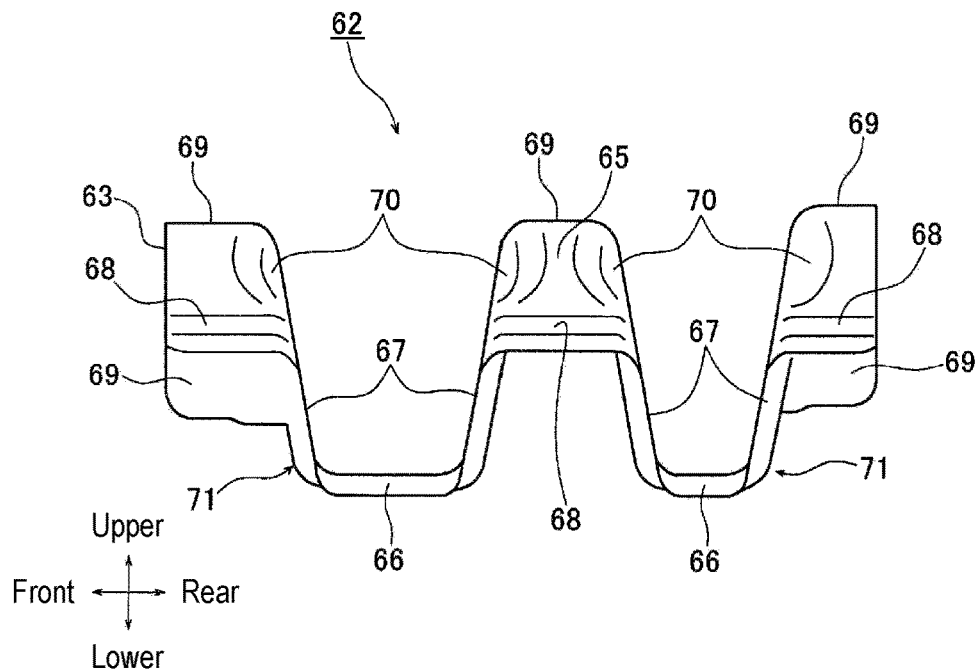
FIGS. 6A and 6B are views illustrating the second reinforcement member according to the second embodiment of the disclosure.
Figure 6B:
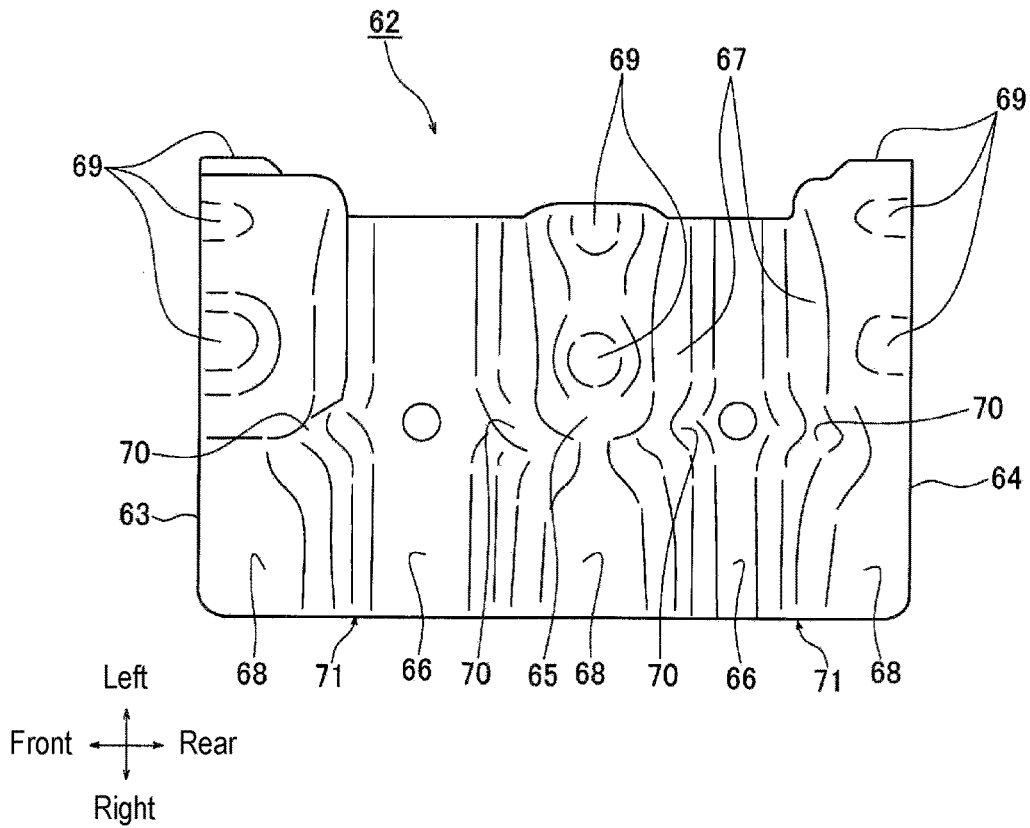
Figure 7:
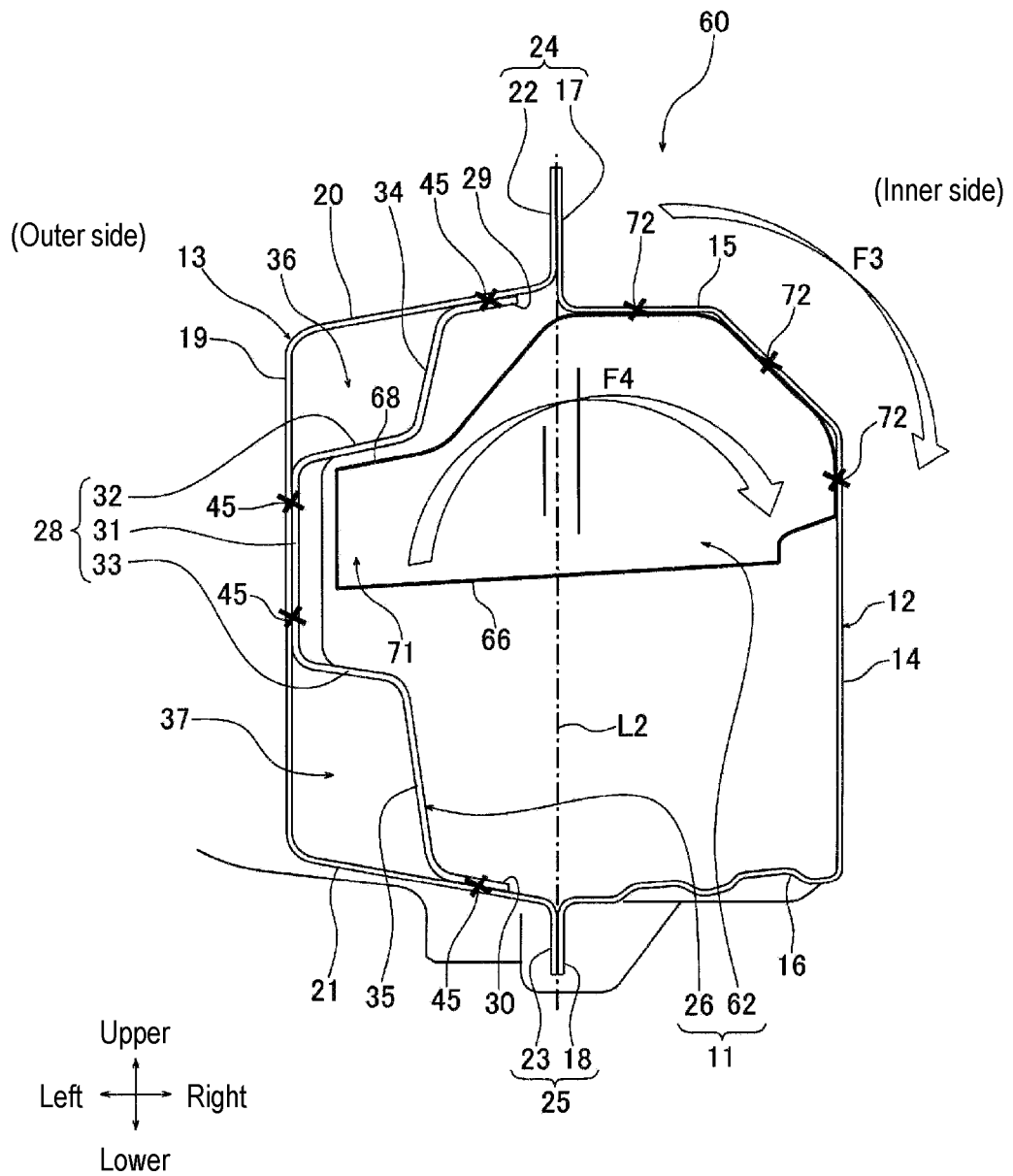
FIG. 7 is a cross-sectional view taken along C-C of FIG. 4.

FIG. 4 is a view that partially sees through a portion (a place where a reinforcement member is arranged) of a side sill structure according to a second embodiment of the disclosure, and is a perspective view illustrating a state when viewed from behind. FIGS. 5A and 5B are views illustrating a second reinforcement member according to the second embodiment of the disclosure. FIG. 5A is a perspective view illustrating the second reinforcement member in a state when viewed from upper left, and FIG. 5B is a perspective view illustrating the second reinforcement member in a state when viewed from upper right. FIGS. 6A and 6B are views illustrating the second reinforcement member according to the second embodiment of the disclosure. FIG. 6A is a side view of the second reinforcement member, and FIG. 6B is a plan view of the second reinforcement member. FIG. 7 is a cross-sectional view taken along C-C of FIG. 4.

Besides, the arrows in the figures respectively illustrate the upper-lower direction, the left-right direction, and the front-rear direction (the directions of the arrows merely serve as an example). In addition, components the same as the first embodiment are labeled with the same reference symbols, and details thereof will not be repetitively described.

In the embodiment, a case where a side sill structure according to the disclosure is applied to a side sill 60 in the floor part 2 of the vehicle body 1 of the vehicle shown in FIGS. 1A and 1B. The side sill 60 in the embodiment shown in FIG. 4 is substantially the same as the side sill 3 in the first embodiment in terms of configuration and structure, except that a reinforcement member 61 replaces the reinforcement member 11 (see FIG. 2) of the first embodiment.

The reinforcement member 61 of the embodiment is substantially the same as the reinforcement member 11 of the first embodiment in terms of configuration and structure, except that the reinforcement member 61 includes a second reinforcement member 62. In the following, the second reinforcement member 62 is described.

Then, as shown in FIGS. 5A, 5B, 6A and 6B, the second reinforcement member 62 is a member formed by bending a metal plate in a predetermined shape, and is formed in a wave shape (a substantially W shape) when viewed from the vehicle width direction (left-right direction), as shown in FIG. 6A.

The second reinforcement member 62 includes sleeve parts 63, 64 provided at a front upper end and a front lower end in the front-rear direction, an upper surface 65 provided at a middle upper end in the front-rear direction, lower surfaces 66 provided at a lower end between the sleeve parts 63, 64 and the upper surface 65, and inclined surfaces 67 connecting the sleeve part 63 and the lower surface 66, the upper surface 65 and the lower surface 66, and the sleeve part 64 and the lower surface 66.

On the sleeve parts 63, 64 and the upper surface 65, an abutting surface 68 formed on the left end side in the left-right direction and multiple bonding parts 69 formed from the middle over the right end side in the left-right direction are provided. The abutting surface 68 is formed to be abuttable against the upper wall 32 of the concave part 28 of the first reinforcement member 26 when the side sill 60 is twisted (as indicated by an arrow F3 shown in FIG. 7) due to input of a side impact load and the second reinforcement member 62 rotates (as indicated by an arrow F4 shown in FIG. 7).

The bonding part 69 is formed to be bondable with the inner wall 14 and the upper wall 15 of the inner panel 12. In FIG. 7, the reference symbol 72 represents a bonded portion between the second reinforcement member 62 and the inner panel 12.

On the inclined surface 67, a bead part 70 is formed from the upper end over the lower end in the middle of the left-right direction. The bead part 70 is formed to be concave to the outer side on the respective inclined surfaces 67 facing each other to sandwich the lower surface 66.

The lower surface 66 is formed to be gradually inclined downward from the inner side toward the outer side in the vehicle width direction in a state in which the second reinforcement member 62 is bonded to the inner panel 12 as shown in FIG. 7.

The second reinforcement member 62 includes a protrusion part 71 as shown in FIGS. 5A, 5B, 6A and 6B. The protrusion part 71 is formed by the abutting surface 68, the lower surface 66, and a pair of inclined surfaces 67 sandwiching the lower surface 66 to face each other. The protrusion part 71 is formed so that the width in the height direction of the protrusion part 71 (the upper-lower direction) is gradually reduced from the inner side toward the outer side in the vehicle width direction.

The second reinforcement member 62 is disposed so that at least a portion of the second reinforcement member 62 enters the concave part 28 in a state of being bonded to the inner panel 12, as shown in FIG. 7. More specifically, the second reinforcement member 62 is disposed so that the tip side of the protrusion part 71 enters the concave part 28.

In addition, the second reinforcement member 62 is formed so that the protrusion part 71 extends toward the outer side in the vehicle width direction with respect to the bonding flanges 24, (virtual line L2), in the state of being bonded to the inner panel 12.

In the following, the functions and effects obtained through the embodiment are described with reference to FIG. 7. According to the embodiment, the following effects are achieved in addition to the same effects as the first embodiment.

According to the embodiment, the shape of the second reinforcement member 62 when viewed in the vehicle width direction (that is, when viewed from the lateral side of the vehicle body 1) is formed in a wave shape (a substantially W shape). Therefore, it is possible to facilitate the rigidity of the second reinforcement member 62. As a result, when the side sill 60 is twisted (as indicated by the arrow F3 in FIG. 7) due to input of a side impact load, the second reinforcement member 27 rotates (as indicated by the arrow F4 in FIG. 7), and the second reinforcement member 62 and the concave part 28 are fit, it is possible to transmit load between the bulkheads 10 (see FIGS. 1A and 1B) and the side sill 60.

Therefore, it is possible to suppress peeling of the side sill 60 and the deformation of the cross-sectional shape of the side sill 60 when a side impact load is input, and it is possible to facilitate the efficiency of load transmission to the side of the vehicle body 1.

In addition, according to the embodiment, the lower surface 66 of the second reinforcement member 62 is gradually inclined downward from the inner side toward the outer side in the vehicle width direction. Therefore, it is possible to easily input the rotation (see the arrow F3 shown in FIG. 7) input to the side sill 60 to the second reinforcement member 62. As a result, it is possible to suppress the deformation of the cross-sectional shape and the peeling of the side sill 60.

Here, the rotation input to the side sill 60 is the rotation with which the top of the side sill 60 collapses toward the side of the compartment inside 8 of the vehicle (see the arrow F3 shown in FIG. 7). Therefore, it is easy to transmit a load from the outer panel 13 to the inner panel 12.

Therefore, it is possible to suppress peeling of the side sill 60 and the deformation of the cross-sectional shape of the side sill 60 when a side impact load is input, and it is possible to facilitate the efficiency of load transmission to the side of the vehicle body 1.

In addition, it goes without saying that the disclosure can be modified in various ways without departing from the gist of the disclosure.

What is claimed is:

1. A vehicle side sill structure, wherein a side sill arranged at two ends in a vehicle width direction in a floor part of a vehicle and extending in a front-rear direction of the vehicle comprises: an inner panel, forming an inner side in the vehicle width direction; an outer panel, forming an outer side in the vehicle width direction; and a reinforcement member, arranged in a closed section formed by bonding the inner panel and the outer panel,
    wherein the reinforcement member comprises a first reinforcement member bonded to the outer panel and a second reinforcement member bonded to the inner panel, and
    the first reinforcement member comprises a concave part concave to the outer side in the vehicle width direction, and the second reinforcement member is disposed so that at least a portion of the second reinforcement member enters the concave part,
    wherein the second reinforcement member is bonded to an inner wall of the inner panel and an upper wall continuous with the inner wall.

2. The vehicle side sill structure as claimed in claim 1, wherein the side sill comprises a bonding flange formed by bonding the inner panel and the outer panel, and
    the second reinforcement member extends outward in the vehicle width direction with respect to the bonding flange.

3. A vehicle side sill structure, wherein a side sill arranged at two ends in a vehicle width direction in a floor part of a vehicle and extending in a front-rear direction of the vehicle comprises: an inner panel, forming an inner side in the vehicle width direction; an outer panel, forming an outer side in the vehicle width direction; and a reinforcement member, arranged in a closed section formed by bonding the inner panel and the outer panel,
    wherein the reinforcement member comprises a first reinforcement member bonded to the outer panel and a second reinforcement member bonded to the inner panel, and
    the first reinforcement member comprises a concave part concave to the outer side in the vehicle width direction, and the second reinforcement member is disposed so that at least a portion of the second reinforcement member enters the concave part,
    wherein the first reinforcement member is bonded to an upper wall and a lower wall of the outer panel, and the concave part is bonded to an outer wall of the outer panel continuous with each of the upper wall and the lower wall of the outer panel.

4. The vehicle side sill structure as claimed in claim 3, wherein by separating the concave part of the first reinforcement member and the outer panel in a height direction of the concave part, closed sections are formed on two sides of the concave part in the height direction.

5. The vehicle side sill structure as claimed in claim 1, wherein the side sill comprises a bulkhead arranged with a cross member in the vehicle width direction, the cross member extending in the vehicle width direction in the floor part,
    wherein the reinforcement member is arranged between a center pillar of a vehicle body and the bulkhead.

6. The vehicle side sill structure as claimed in claim 1, wherein the second reinforcement member comprises a protrusion part, the protrusion part is formed in a U shape open to the inner side in the vehicle width direction when viewed from an axial direction of the side sill, and at least a portion of the protrusion part enters the concave part of the first reinforcement member.

7. The vehicle side sill structure as claimed in claim 6, wherein in the protrusion part of the second reinforcement part, a width of the protrusion part in an upper-lower direction is gradually reduced from the inner side toward the outer side in the vehicle width direction.

8. The vehicle side sill structure as claimed in claim 1, wherein the second reinforcement member is formed in a wave shape when viewed in the vehicle width direction.

9. The vehicle side sill structure as claimed in claim 8, wherein in the second reinforcement member, a lower surface of the second reinforcement member is gradually inclined downward from the inner side toward the outer side in the vehicle width direction.

* * * * *